United States Patent
Robinson et al.

(10) Patent No.: US 11,028,614 B1
(45) Date of Patent: Jun. 8, 2021

(54) ANIMAL REPELLING DEVICE

(71) Applicants: Kip G. Robinson, Rexburg, ID (US); Robert B. Ginos, Mesa, AZ (US)

(72) Inventors: Kip G. Robinson, Rexburg, ID (US); Robert B. Ginos, Mesa, AZ (US)

(73) Assignee: ROLL GUARD, INC., Mesa, AZ (US)

( * ) Notice: Subject to any disclaimer, the term of this patent is extended or adjusted under 35 U.S.C. 154(b) by 0 days.

(21) Appl. No.: 16/684,448

(22) Filed: Nov. 14, 2019

(51) Int. Cl.
*A01K 3/00* (2006.01)
*E04H 17/00* (2006.01)
*A01M 29/16* (2011.01)
*A01M 29/06* (2011.01)

(52) U.S. Cl.
CPC ........... *E04H 17/003* (2013.01); *A01M 29/06* (2013.01); *A01M 29/16* (2013.01)

(58) Field of Classification Search
None
See application file for complete search history.

(56) References Cited

U.S. PATENT DOCUMENTS

| | | | | |
|---|---|---|---|---|
| 259,654 A | * | 6/1882 | Worthington | E04H 17/003 256/12 |
| 321,171 A | * | 6/1885 | Archibald | E04H 17/003 256/12 |
| 504,936 A | | 9/1893 | Niles | |
| 511,700 A | * | 12/1893 | Jacobs | E04H 17/00 256/12 |
| 1,140,171 A | * | 5/1915 | Brazel | E01B 17/00 256/16 |
| 4,348,012 A | | 9/1982 | McLaughlin | |
| 5,143,354 A | * | 9/1992 | Nolan | A01K 3/00 256/11 |
| 6,102,375 A | * | 8/2000 | Colless | E01F 13/022 256/12 |
| 6,571,517 B2 | | 6/2003 | Wulff et al. | |
| 6,585,233 B1 | * | 7/2003 | Sorben | A01K 3/00 256/1 |
| 9,334,671 B2 | * | 5/2016 | Kelly | E04H 17/04 |
| 9,924,707 B2 | * | 3/2018 | Dambra | E04D 13/004 |
| 2003/0009957 A1 | * | 1/2003 | Wulff | A01G 13/10 52/101 |

(Continued)

FOREIGN PATENT DOCUMENTS

CN 204482831 U 7/2015
GB 2502042 A 11/2013

(Continued)

*Primary Examiner* — Basil S Katcheves
(74) *Attorney, Agent, or Firm* — Booth Udall Fuller, PLC; Pacer K. Udall

(57) ABSTRACT

An animal repelling device may include a first mounting bracket and a second mounting bracket, each of which includes an upper section and a lower section. The upper section may include a vertical tab, a notch formed in the vertical tab, and ribs coupled to opposing sides of the vertical tab. The lower section may include a foot coupled to a sidewall, the sidewall comprising a curved inner surface configured to mateably couple with a fence. A roller may be disposed between, be rotatably coupled to, and extend axially between, the first mounting bracket and the second mounting bracket, the roller comprising an aligner that biases the roller back to an initial at rest position. An attachment clip may be releasably coupled to the notch of the vertical tab.

18 Claims, 11 Drawing Sheets

(56) References Cited

U.S. PATENT DOCUMENTS

| | | | | |
|---|---|---|---|---|
| 2003/0015301 | A1* | 1/2003 | Killo | E06B 9/70 |
| | | | | 160/310 |
| 2005/0189529 | A1* | 9/2005 | Humphreys | E04H 17/003 |
| | | | | 256/12 |
| 2010/0229802 | A1 | 9/2010 | Bok | |
| 2010/0243979 | A1* | 9/2010 | Moore | E04H 17/02 |
| | | | | 256/19 |
| 2017/0356215 | A1* | 12/2017 | Kim | E01D 19/10 |
| 2019/0345732 | A1* | 11/2019 | Wicks | E04H 17/04 |

FOREIGN PATENT DOCUMENTS

| | | | |
|---|---|---|---|
| JP | 2973195 | B2 | 9/1999 |
| JP | 4092432 | B2 | 5/2008 |
| JP | 6339050 | B2 | 6/2018 |
| WO | 2017173512 | A1 | 10/2017 |

\* cited by examiner

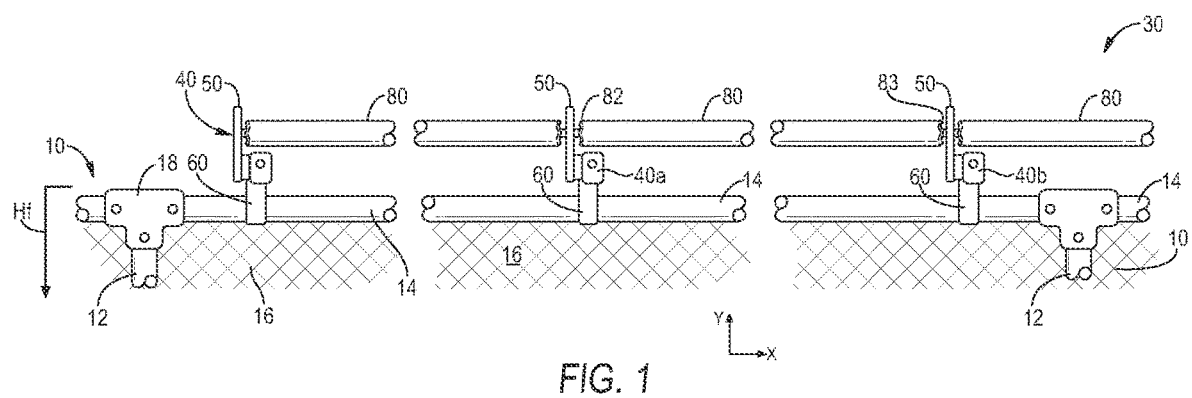
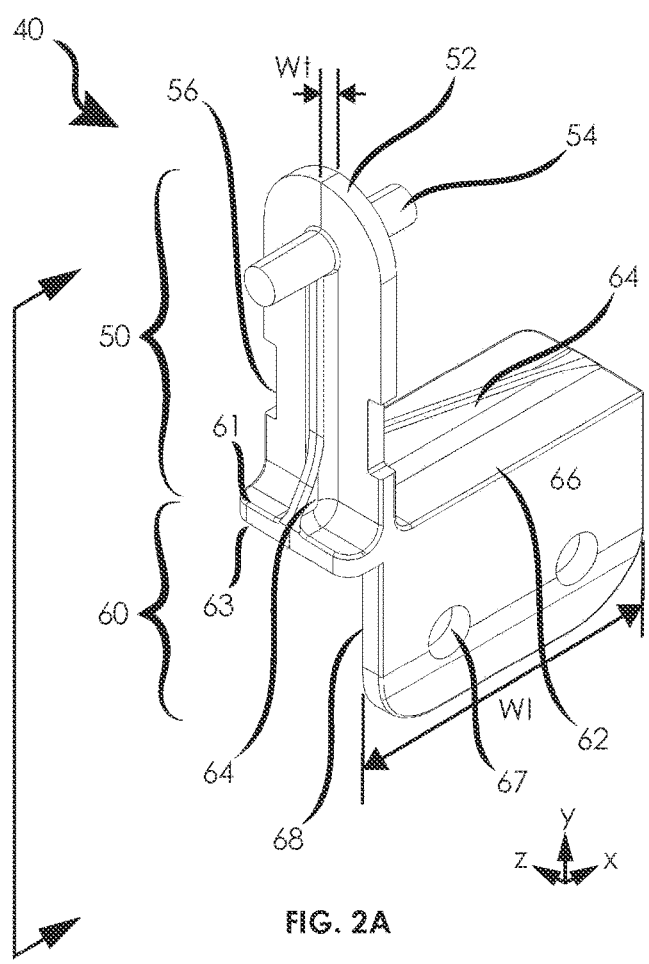

ANIMAL REPELLING DEVICE

FIELD OF USE

This disclosure relates to an animal repelling device, system, and method for mounting on a barrier or fence to prevent the invasion of wild animals, and to prevent the escape of domestic animals into the wild.

BACKGROUND

The present disclosure relates to an improvement in animal-repelling devices, and more particularly to animal-repelling devices mountable onto a boundary structure such as a fence or similar barrier designed to keep wild animals, as well as uninvited domestic animals and persons out.

With population growth continuing to tax urban environments for space, the countryside, near and outlying, have and are being developed. The more development encroaches upon the countryside, or is at an urban-countryside interface, the more likely encounters with wild-animals and animal property invasions will be. Conventional fences and other border barriers have not been sufficient to prevent wild animals from scaling fences, barriers, and entering property; nor have they been sufficient to prevent one's pet, such as a dog in particular, from scaling the fence or barrier to get out. Dangers abound with either scenario. The intrusion of a wild animal into one's backyard, in spite of a 'protective' fence places one's domestic pet and household members and guests at risk of harm, disease, or both. Property damage, eating up one's garden or a pet's food supply, are common with such intrusions. A pet dog escaping the comfort of a backyard exposes itself to the dangers of the wild and may never return as a result.

SUMMARY

A need exists for an improved animal repelling device, system, and method.

Accordingly, in an aspect, an animal repelling device may comprise a first mounting bracket and a second mounting bracket, each of which comprises an upper section and a lower section. The upper section may comprise a vertical tab coupled to and extending from the lower section, a notch formed in the vertical tab, and ribs coupled to opposing sides of the vertical tab and the lower section of the mounting bracket to provide structural support. The lower section may comprise a foot with an upper surface and a lower surface opposite the upper surface, the vertical tab coupled to and extending from the upper surface of the foot and a sidewall coupled to and extending from the lower surface of the foot, the sidewall comprising a curved inner surface configured to mateably couple with an upper circular rail of a fence. A roller may be disposed between, be rotatably coupled to, and extend axially between, the first mounting bracket and the second mounting bracket, the roller comprising an aligner that biases the roller back to an initial at rest position. An attachment clip may be releasably coupled to the notch of the vertical tab of at least one of the first mounting bracket or the second mounting bracket, the attachable accessory comprising one or more of a noise making clip, a security finial clip, a lamp clip, or a siren clip.

The animal repelling device may further comprise the animal repelling device being formed of a weather resistant non-corrodible material. The curved inner surface of the sidewall may comprise a radius of curvature in a range of 2.5-20 centimeters. The security finial may comprise a trident with a width greater than a width of the mounting bracket to which the security finial clip is coupled. The noise making clip may further comprise an arm comprising a rolled edge coupled to the notch of the vertical tab, and a tongue flexibly coupled to the arm and extending to intermittently contact the roller when the roller is spinning. The aligner of the roller may comprise a weighted feature configured to rotate the roller to a position with the aligner at the bottom of the roller. The vertical tab may be offset with respect to the foot of the lower section of the mounting bracket.

In another aspect, an animal repelling device may comprise at least one mounting bracket comprising an upper section and a lower section. The upper section may comprise a vertical tab coupled to and extending from the lower section, a notch formed in the vertical tab, and a rib coupled to the vertical tab. The lower section may comprise a sidewall that extends away from the vertical tab, the sidewall comprising a curved inner surface. A roller may be coupled to and extend axially from the first mounting bracket. An attachment clip may be releasably coupled to the notch of the vertical tab of at least one of the first mounting bracket or the second mounting bracket.

The animal repelling device may further comprise the rib coupled to the vertical tab comprising first and second ribs coupled to opposing sides of the vertical tab and further coupled to the lower section of the mounting bracket. The sidewall may comprise a curved inner surface comprising a radius of curvature in a range of 2.5-20 centimeters. The attachment clip may further comprise a security finial that comprises a trident with a width greater than a width of the mounting bracket to which the security finial clip is coupled. The attachment clip may further comprise a noise making clip that comprises an arm comprising a rolled edge coupled to the notch of the vertical tab, and a tongue flexibly coupled to the arm and extending to intermittently contact the roller when the roller is spinning. The roller may comprise an aligner configured to rotate the roller to an at rest position. The vertical tab is offset with respect to the foot of the lower section of the mounting bracket.

In yet another aspect, an animal repelling device may comprise a mounting bracket comprising an upper section and a lower section. The upper section may comprise a vertical tab coupled to and extending from the lower section, a notch formed in the vertical tab, and a rib coupled to the vertical tab. The lower section may comprise a sidewall that extends away from the vertical tab. A roller may be coupled to, and extend axially from, the mounting bracket.

The animal repelling device may further comprise the rib coupled to the vertical tab further comprising first and second ribs coupled to opposing sides of the vertical tab and further coupled to the lower section of the mounting bracket. The sidewall may comprise a curved inner surface comprising a radius of curvature in a range of 2.5-20 centimeters. An attachment clip may be included that comprises a security finial that comprises a trident with a width greater than a width of the mounting bracket to which the security finial clip is coupled. An attachment clip may be included that comprises a noise making clip that further comprises an arm comprising a rolled edge coupled to the notch of the vertical tab, and a tongue flexibly coupled to the arm and extending to intermittently contact the roller when the roller is spinning. The roller may comprise an aligner configured to rotate the roller to an at rest position.

BRIEF DESCRIPTION OF THE DRAWINGS

FIG. 1 shows an example of an animal repelling device mounted to a top of a fence or wall.

FIGS. 2A-2F show examples of various mounting brackets that may be used as part of the animal repelling device.

DETAILED DESCRIPTION

Figure 2B:
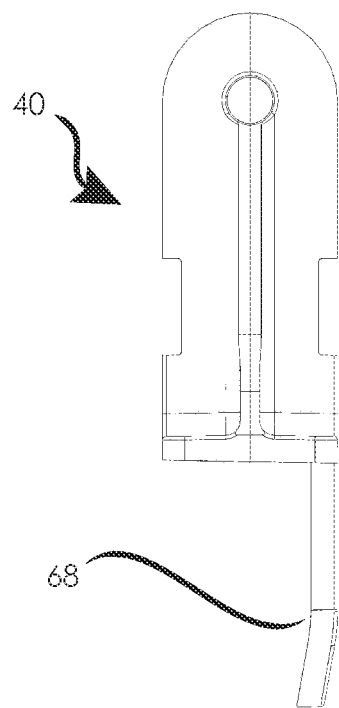

This disclosure, its aspects and implementations, are not limited to the specific material types, or other system component examples, or methods disclosed herein. Many additional components, construction and assembly procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Previous designs for animal repelling devices known in the art have included dangerous and potentially lethal features, such as spikes, sharp objects, or barbed-wire as part of their designs. Some have a rotational function with or without dangerous objects on top. Most are complex in structure, assembly, and maintenance. The current design disclosed herein, as will be seen, may provide the additional advantages of being easy to install, easy to maintain, low in cost, and aesthetically appealing.

Moreover, the present design is mountable on virtually all types of fences or mounting structures 10, including walls, roofs, and boundary barriers 10, whether they be wooden fences, split-rail fences, chain-link fences, wrought-iron fences, or of masonry, brick, stone, block, or other solid-like construction. As such, the present design may provide for an effective and safe animal-repeller for keeping unwanted animals out and domestic pets in. The current design may create an easy-to-maintain and easy-to-install animal-repeller that requires no special skill or tools to install. The current design may be affordable and of relatively simple construction. The current design may help maintain a safe environment for a person on their own property. Finally, and among other things, the current design may protect domestic pets from harm causable by wild animals.

FIG. 1 shows an elevation or profile view of the animal repelling device 30 mounted on or at a top or upper surface of fence 10. As a person of ordinary skill in the art (POSA) will appreciate, fence 10 is shown by way of illustration and not by limitation as a chain-link fence. The fence 10 may comprise one or more posts or vertical supports 12, as well as one or more rails or horizontal supports 14. Panels 16 of any suitable material, including wire mesh, may be disposed between, and may be coupled to, the posts 12, rails 14, or both. In some instances, the posts 12 and rails 14 may be coupled together with connectors, attachments devices, or brackets 18. The fence 10 comprises a height Hf that may be of any standard or desirable height.

FIG. 1 also shows the animal repelling device 30 may comprise a plurality of mounting brackets 40, such as a first mounting bracket 40a and a second mounting bracket 40b. Additional detail with respect to brackets 40 is presented with respect to FIGS. 2A-2F. Each of the mounting brackets 40, comprises a lower section or portion 60 and an upper section or portion 50. The lower section 60 may comprise a curved inner surface 68 configured to mateably couple with an upper circular rail 14 of fence 10. The upper section 50 may comprise a notch or cutout 56, at least one foot 62, and at least one rib 64, the foot 62 and rib 64 disposed on opposing sides of the upper section 50 of the mounting bracket 40 to provide structural support.

A roller 80 may be disposed between and extending axially between a first mounting bracket 40a and a second mounting bracket 40b, the roller 80 comprising an aligner 90 that biases the roller 80 back to an initial position or at rest position. An attachable accessory 110 may be releasably coupled to the notch 56 of the upper section 50 of at least one of the mounting brackets 40, such as the first mounting bracket 40a or the second mounting bracket 40b. The attachable accessory 120 may comprise one or more of a noise making clip 120, a security finial clip 130, a lamp clip 140, or a siren clip 150.

A method of installing or mounting the animal repelling device 30 to the fence or mounting structure 10 may include coupling a first mounting bracket 40 to the fence 10. The sidewall or mounting flange 66 may prevent the mounting bracket 40 from undesirably moving from, or rotating on, the fence 10. The openings 67 in the mounting flange 66 may be used to secure the mounting bracket 40 to the fence 10, such as by using the apertures 67 as a guide to drill holes into the fence 10 and for the insertion of bolts or other fastening device.

With a first mounting bracket 40a coupled to the fence 10 a first end 82 of roller 80 may be coupled to the first mounting bracket 40a. Thereafter, a second end 83 of the roller 80 may be coupled to a second mounting bracket 40b, the second mounting bracket 40b also being coupled to the fence 10. The axels 54 of the mounting brackets 80 may be inserted into the openings 85 in the roller 80 and openings 85a in the roller cap 85, as applicable, and as shown and described with respect to the subsequent FIGs. In some instances, the first end 82 of the roller 80 may be held in place while the second mounting member 40b is coupled to the opposing second end 83 of the roller 80. The second mounting bracket 40b may then be coupled or securely fastened to the fence 10. In other instances, both mounting brackets 40 may be fastened or coupled to the fence 10 before the roller 80 is coupled to the mounting brackets 40, such as when the axels 54 are adjustable, spring loaded, or not made as a single unit or piece with the mounting bracket 40, or when the roller 80 is collapsible, telescoping, or otherwise configured to be so attached. Alternatively, the roller may be rotatably coupled to the mounting brackets 40 before one or more of the mounting brackets 40 are coupled to the fence 40.

The above method or process may be repeated as many times as desired, until repeating lengths of rollers 80 and mounting brackets 40 extend to ends of the fence 10. To facilitate instillation, one or more rollers 80 may be cut to length to fit the installment area.

Once installed on fence 10, the animal repelling device 30 may function or operate to prevent passage of animals over the fence 10. For example, when an animal, such as a coyote or other wild animal, a third-party's dog or cat, or any other non-invited animal attempts to scale the fence 10, as the animal jumps upward with front paws (or legs) outstretched, expecting to touch a stable fence-top, the paws instead contact roller 80. Rather than finding a stable surface from which to cling and complete the traverse by bringing up the rear paws while pulling or being stabilized by front paws, the roller 80 rotates toward the animal, causing the front paws to roll down and off the roller 80 and the animal falls to the ground. As such, the animal will be denied entry, and subsequently avoid the area. In order to achieve the desired results or limiting, reducing, or preventing unwanted animal access with animal repelling device 30, the animal repelling device 30 is set forth in additional detail below.

FIGS. 2A-2F show various embodiments of mounting brackets 40. The mounting brackets 40 may be made of a suitable metal, such as steel, iron, cast iron, aluminum, brass, bronze, copper, nickel, zinc, chrome, and may be galvanized, stainless, anodized, plated, coated, or otherwise treated so as to be formed of a weather resistant non-corrodible material. In some instances, the mounting brackets 40 may be made of plastic, fiberglass, carbon fiber, wood, composite material, ceramic, or other synthetic or natural material. The mounting brackets 40 may be formed by extrusion, molding, casting, machining, 3D-printing, or any other suitable process, whether additive, reductive, or both.

FIG. 2A shows a perspective view of an embodiment of a mounting bracket 40, with the upper section or portion 50 of the mounting bracket 40 asymmetrically mounted with respect to the lower section 60 of the mounting bracket 40. Thus, the vertical tab 52 of the upper section 50 of the mounting bracket 40 is not centered with respect to the width W1 of lower section 60 of mounting bracket 40. The vertical tab 52 may also comprise notches or cutouts 56 configured to receive or mateably couple with attachment clips or attachable accessories 110. In some instances, the notches or cutouts 56 may be formed by removing material from the mounting bracket 40, including the vertical tab 52, while in other instances, the mounting bracket 40 may be formed without any material disposed in the area or position of the notch 56, making subsequent removal of the material unnecessary.

FIG. 2A additionally shows that the mounting bracket 40 further comprises feet 62 that form a base or support for resting on fence 10, the feet 62 extending in a horizontal direction, roughly parallel to the ground, and roughly contained in or following an x-z plane. Mounting bracket 40 is shown further comprising ribs or vertical reinforcing members 64 that extend between the vertical tab 52 and the horizontal feet 62. The ribs 64 may be principally formed in, or extend through, a x-y plane, being orthogonal or perpendicular to the vertical tab 52 and the feet 62, and providing a increased moment of inertia for the vertical tab 52, to reduce torsion, bending, deformation, and failure of the vertical tab 52, especially when transmitting loads from the roller 80 to the fence 10. As shown in FIG. 2A, the ribs need not be symmetrically formed about the vertical tab 52, and may be disposed below or offset from the notches 56, so as to not interfere with attachment clips 110. In some instances, one or more of the axels 54, the vertical tab 52, the feet 62, and the ribs 64, and entirety of the mounting bracket 40 may be formed of a single material at a single time, to form a unitary or singular unit.

FIG. 2B shows a cross-sectional profile view of mounting bracket 40 from FIG. 2A taken along section line 2B-2B. As shown in FIG. 2B, the sidewall or mounting flange 66 may comprise a curved inner surface 68 of the sidewall or mounting flange 66 that may be used to couple to any type of fence 10, including a chain-link fence 10 comprising a curved rail 14 that further comprises a circular cross-section that may mateably coupled to the curved inner surface 68 of the sidewall or mounting flange 66, such as without any intervening members, and provide a solid and robust fit. The curved inner surface 68 may comprise a radius of curvature in a range of 2.5-20 centimeters (cm) (or 1-8 inches (in.)), 5-15 cm (or 2-6 in.) or about 10 cm (4 in.), where "about" as used herein means a percent difference less than or equal to 20%, 10%, 5%, 3% or 1%.

Figure 2C:
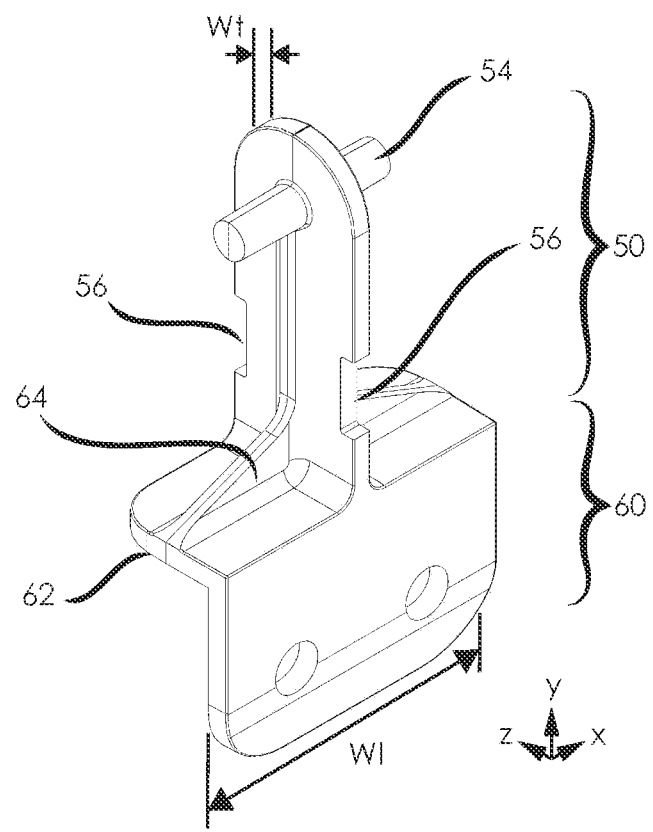

FIG. 2C shows a perspective view of an embodiment of a mounting bracket 40 with vertical tab 52 symmetrically mounted with respect to the lower section 60 of the mounting bracket 40. Mounting bracket 40 is thus shown comprising the vertical tab 52 centered with respect to the width Wt of the tab 52 such that the feet 62 and the ribs 64 may be symmetrical coupled to, and about, the vertical tab 52.

Figure 2D:
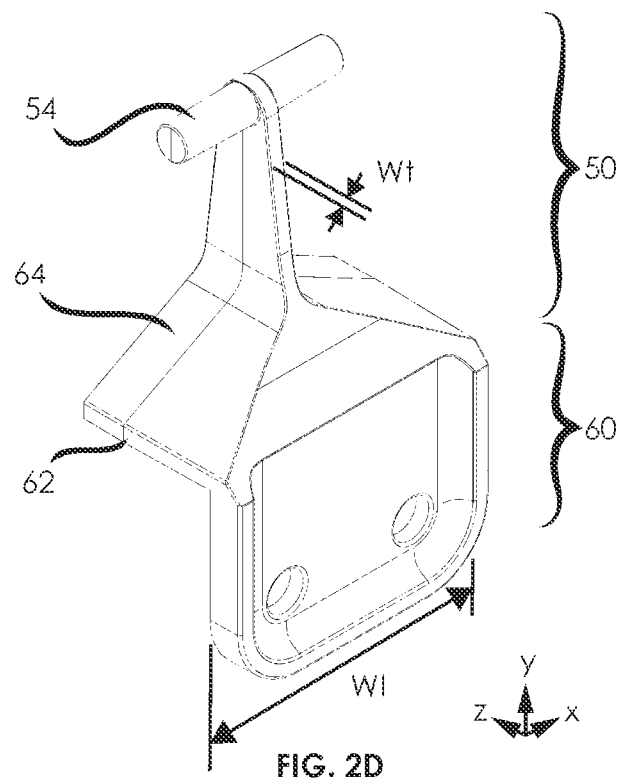

FIG. 2D shows a perspective view of an embodiment of a mounting bracket 40 similar to the mounting bracket 40 show in FIG. 2C, with the vertical tab 52 mounted symmetrically with respect to lower section 60 and mounting bracket 40. FIG. 2 D further shows the mounting bracket 40 differs from the mounting bracket of FIG. 2C by showing the foot 62 and the ribs 64 having been integrally formed such that the lower section 60 has a sloped, angled, or slanted upper surface 61. FIG. 2D also shows that the axles 54 may be disposed at the distal end of vertical tab 52.

Figure 2E:
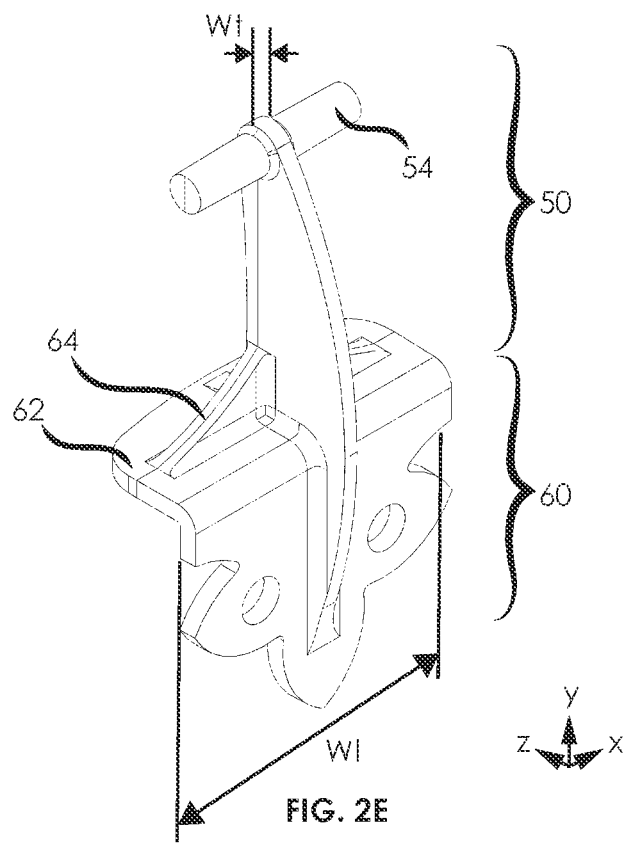

FIG. 2E shows a perspective view of an embodiment of a mounting bracket 40 similar to what was shown in FIG. 2C, but includes the additional features that the axles 54 may be disposed at the distal end of vertical tab 52, and that a portion of the sidewall 66, such as a perimeter may comprise a stylized or aesthetic design. Further, FIG. 2E shows that the vertical tab 52 may extend below the upper section 50, and continue below the foot 62, thereby acting as an additional rib 64 for additional structural support.

Figure 2F:
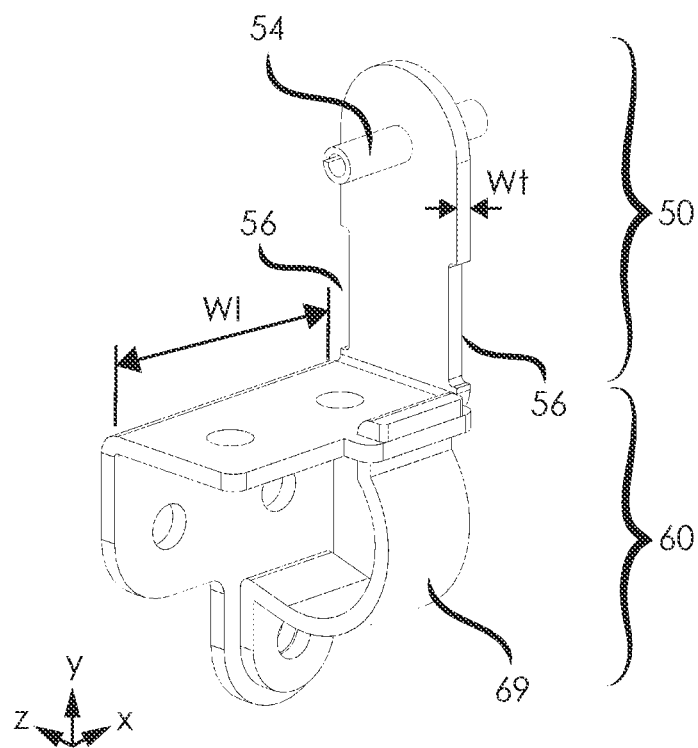

FIG. 2F shows a perspective view of an embodiment of a mounting bracket 40 in which a removable second sidewall 69 may be coupled to, and directly contact, the lower section 60, including foot 62 and sidewall 66 to provide additional support and a more robust connection when coupling the mounting bracket 40 to a fence 10 comprising an upper rail 14.

Figure 3A:
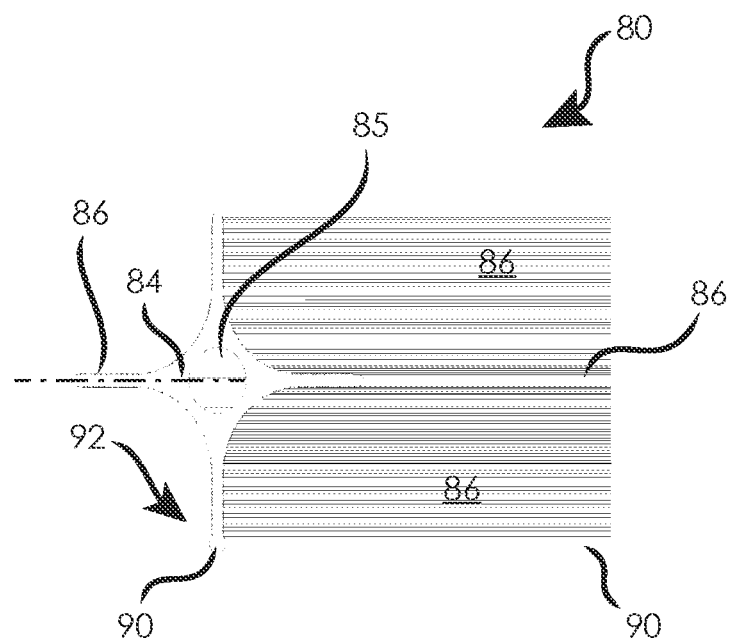
FIGS. 3A-3G show examples of various rollers that may be used as part of the animal repelling device.

FIGS. 3A-3F show various aspects of rollers 89 that may be used as part of the animal repelling device 30. FIG. 3A shows a perspective view of an embodiment of a roller 80. The roller 80 may be made of a suitable metal, such as steel, iron, cast iron, aluminum, brass, bronze, copper, nickel, zinc, chrome, and may be galvanized, stainless, anodized, plated, coated, or otherwise treated or other weather resistant non-corrodible material. In some instances, the roller 80 may be made of plastic, fiberglass, carbon fiber, wood, composite material, ceramic, or other synthetic or natural material. The roller 80 may be formed by extrusion, molding, casting, machining, 3D-printing, or any other suitable process, whether additive, reductive, or both.

FIG. 3A also shows a non-limiting example in which the roller 80 comprises a 4-finned cross-sectional shape comprising a plurality, such as four, ribs or fins 86. While four fins 86 are shown as a non-limiting example, a person of ordinary skill in the art will appreciate that any desirable number of fins may be used. For example, five fins may be employed, like shown in FIG. 4. For example, there could even be just one or two, or three fins as well. The fins 86 may be straight, curved, angled, or sloped. The roller 80 comprises a first end 82 and a second end 83 opposite the first end 82. An axis or central axis 84 can extend along the roller and pass through the first end 82 and the second end 83, including padding through the center of the first end 82 and the second end 83. One or more openings 85 may be formed in one or more, or each, of the first end 82 and the second end 83 and extend partially or completely through the roller 80. As such, the opening 85 may be a single continuous opening extending completely through, and along a length, of the roller 80. In other instances, there may be multiple separate, distinct, and unconnected openings 85. The openings 85 may receive the axels 54 of the of the mounting brackets 54, to allow the roller 80 to rotate along its axis 84 while the mounting brackets 40 remain stationary and coupled to the fence 10.

While the axels 54 have been shown and described as part of the mounting brackets 40 and the openings 85 as part of the roller 80, the reverse may also be true with the roller comprising protrusions or axels 54, and the mounting brackets 40 comprising openings 85 or receiving slots. In yet other instances, both the mounting brackets 40 and the rollers 80 may comprise openings 85, into which are inserted pins, protrusion, or axels 54 that are separate from both the mounting brackets 40 and the rollers 80.

FIG. 3A also shows the roller 80 may comprise an aligner 90 that biases, turns, or rotates the roller 80 back to an initial or at-rest position. The aligner 80 may be formed as a weight coupled to a portion of the roller 80, such that the weighted portion or aligner 90 will be at rest when it is at the bottom of the arc or circle through which the roller 80 will rotate. With the aligner 90 being heavier than he rest of the roller 80 the aligner 90 will rest at the lowest point of the path of travel of the roller 80. FIG. 3A shows the aligner 90 may be formed as a bead 94, such as a reinforced or enlarged strip of material the extends down an entirety or down a portion of the length of a fin 86. The increased mass or weight of the bead 94 will pull the roller 80 by gravity, when at rest and not loaded by any external forces, to have the bead 94 or aligner 90 at the bottom position of the path of rotation of the roller 80.

In other instances, rather than being formed as a bead 94 the aligner 90 may be formed as one or more discrete weights 96 spaced at one or more intervals along the length of the roller 80. The discrete weights 96 forming aligner 90 may be disposed at or along any desired portion of an inner or outer surface of the roller 80.

Figure 3B:
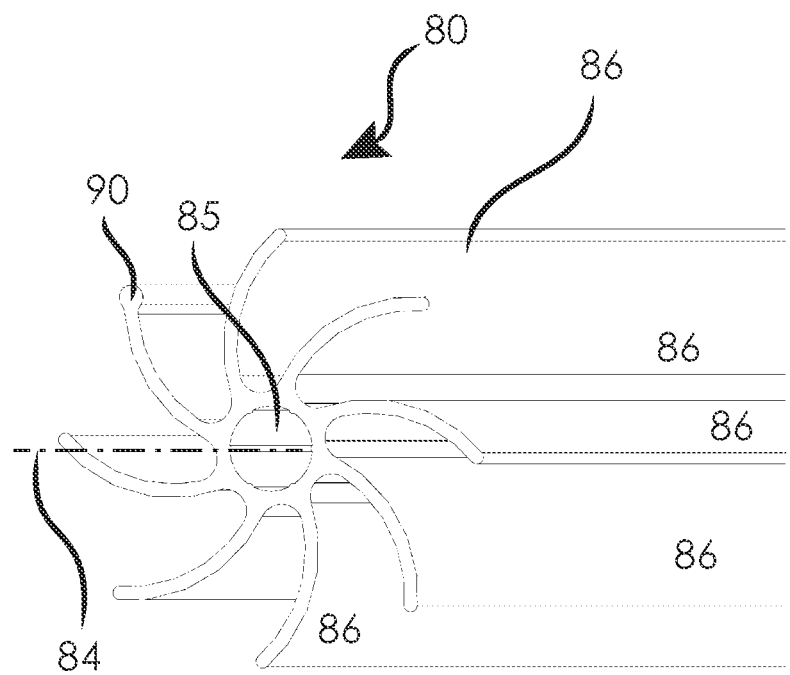

FIG. 3B shows a perspective view of another embodiment of a roller 80 comprising a 8-finned cross-sectional shape. Each of the fins 86 is further shown with a sweeping or curving shape. A central axis 84 of the roller 80 passes through the opening 85. A distal end of one of the fins 86 is shown with an aligner 90 formed as a bead or thickened portion at the end or tip of the fin 86. The additional mass or weight of the fin 86 with the aligner 90 will cause the roller 80 to rotate about its axis 84 and return to an at rest position, with the aligner 90 oriented downward or at a lowest point along its rotational path after the roller 80 is placed in motion, such as by an animal, wind, or other force.

Figure 3C:
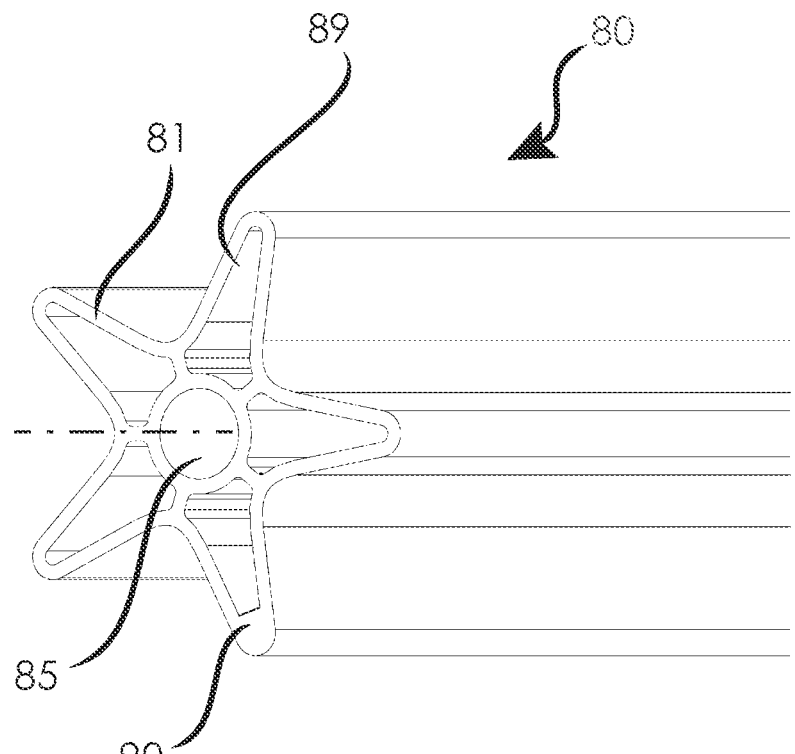

FIG. 3C shows a perspective view of another embodiment of a roller 80 comprising a 5-finned design comprising a star shaped cross-sectional area. Each of the fins 86n is further shown with a hollow interior or section 89, such that the fins 86 comprise adjacent sidewalls 81, separated by a gap, space, or hollow interior 89, rather than being formed of fins 86 comprising a single member, solid structure, or continuous material without a gap as shown in FIGS. 3A and 3B. At a center of the hollow fins 86, an opening 85 (or alternatively an axel 54) may be disposed at, or in line with, the central axis 84. An aligner 90 may be formed as a bead or mass or material that fills a portion of the hollow space within one of the fins 86, or alternatively, may be formed as a thickened sidewall on one of the fins 86.

Figure 3D:
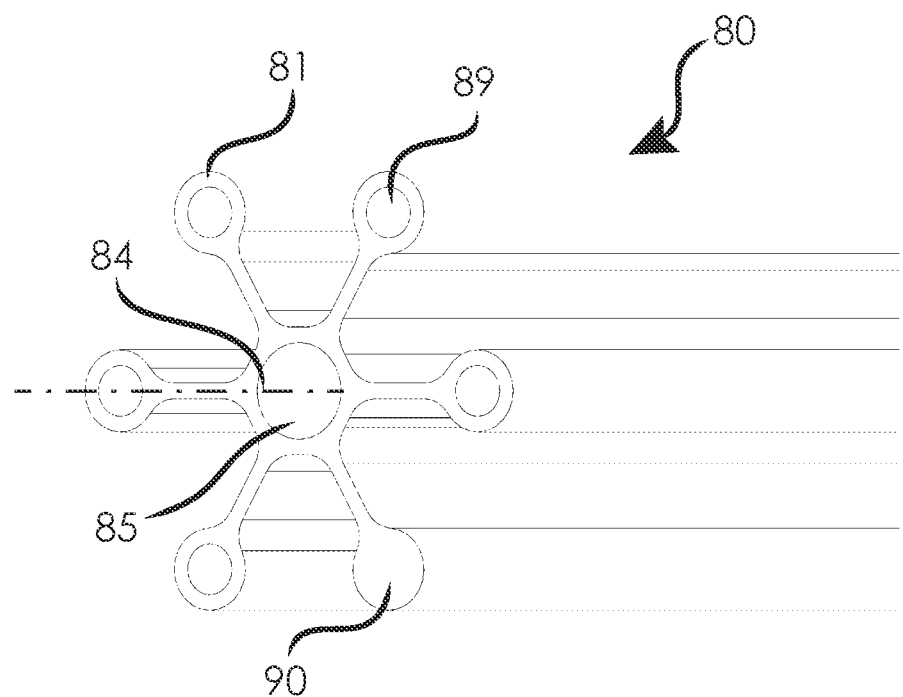

FIG. 3D shows a perspective view of another embodiment of a roller 80 comprising a 6-finned cross-sectional shape. Each of the fins 86 is further shown with a solid portion without a hollow interior 89 adjacent the axis 84 (similar to fins 86 in FIGS. 3A and 3B) and an enlarged portion at a distal end of the fin 86 that does comprise a hollow interior 89. In some instances, the hollow interior 89 may be formed as a tube or channel formed as part of, or integrated with or within, the end of the fin 86. Thus, as shown in FIG. 3D, the fins need not be entirely without a hollow interior 89, nor be entirely comprised of a hollow interior, but may be a mixture.

FIGS. 3A-3D show examples of rollers 80 that comprise openings 85 that are substantially equal in size to a size of axel 54, such that the openings 85 and 54 mateably couple, with or without a bearing, to allow for the roller 80 to roll or rotate around axis 84, and deny solid footing to an animal or person attempting to cross over the fence 10 and the animal repelling device. As used herein, substantially equal allows for enough space for lubricant, a bearing, or some desired relative movement between the axel 54 and the opening 85, while facilitating, and not impeding, the rotation of the roller 80 about its axis 84. As such, "substantially" as used herein means a percent difference in sizes in a range of 0-5%.

Figure 3E:
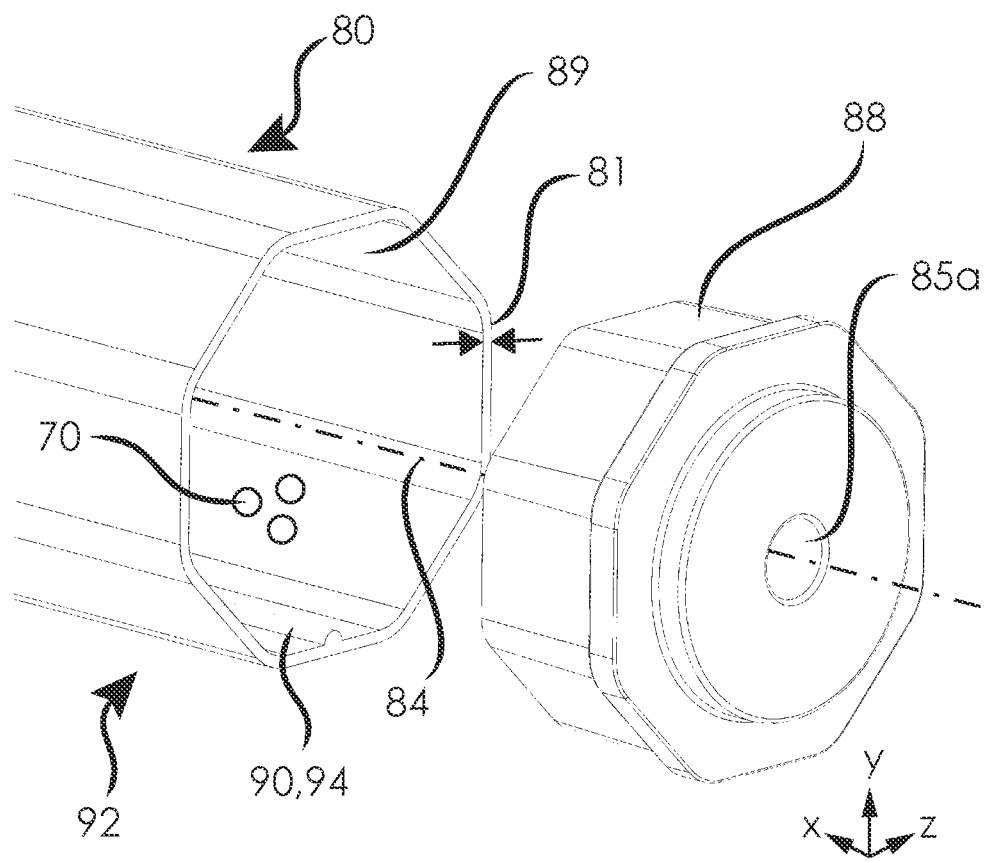
Figure 3F:
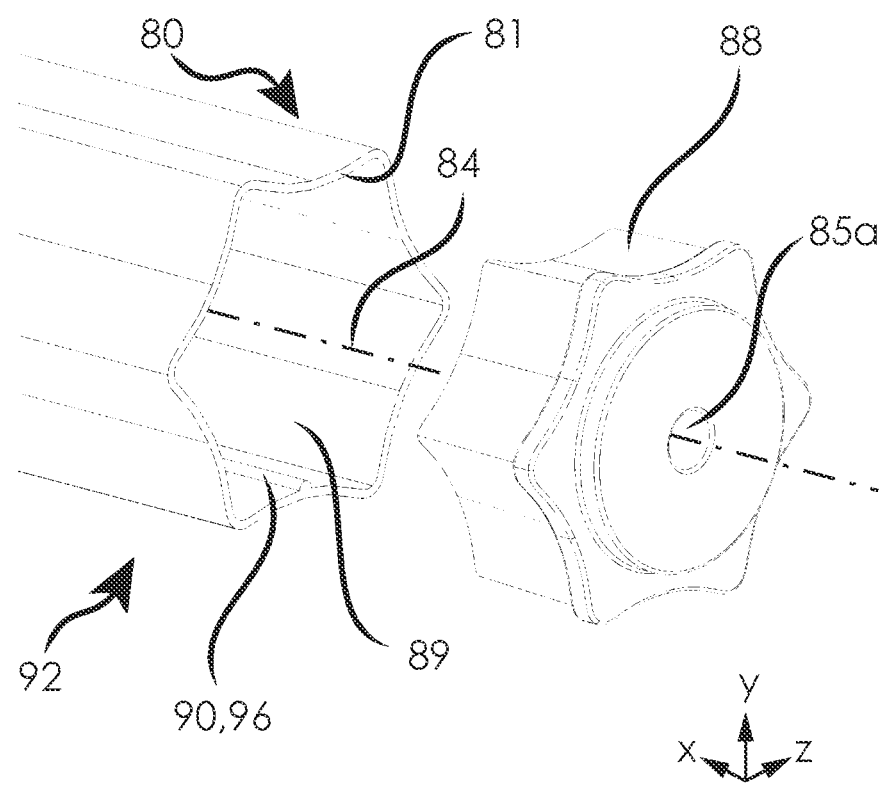
Figure 3G:
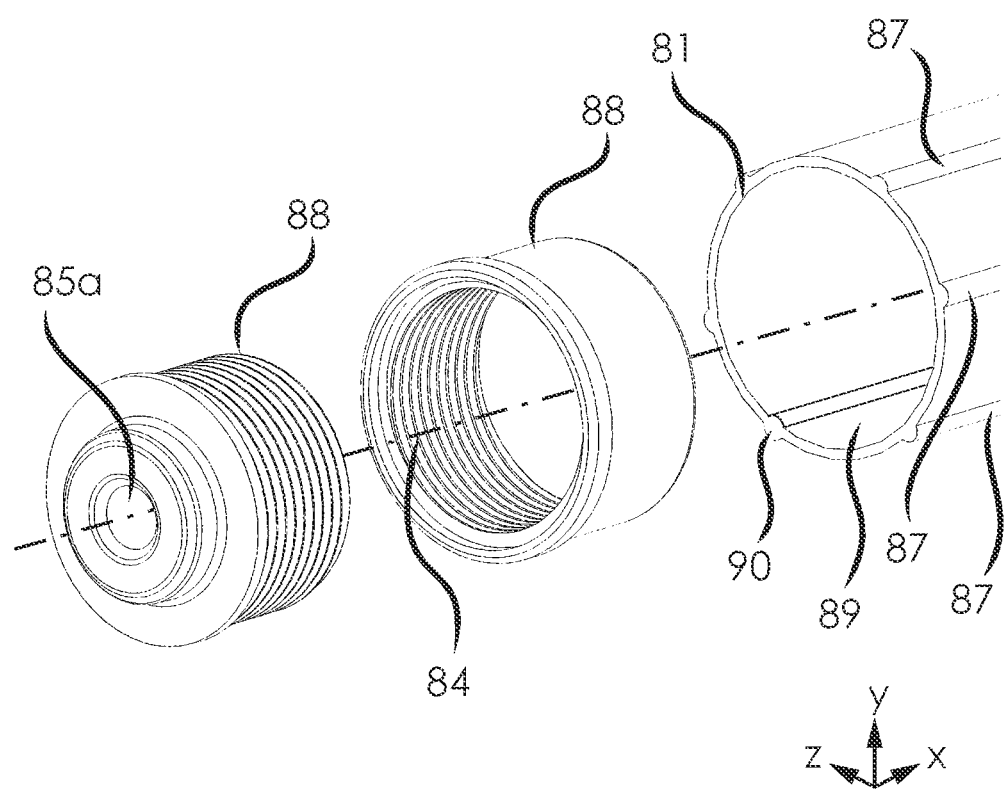

FIGS. 3E-3G show examples of rollers 80 that are tubular and comprise large openings 85 and hollow interiors that further comprise caps or end caps 88. The roller 80 has a hollow interior or hollow inner chamber 89 that may be defined by one or more portions of the sidewall 81. The caps 88 are coupled to, or disposed within, the openings 85, the caps 88 further comprising openings 85a in the caps 85 that are substantially equal in size to a size with the axel 54. As such, the openings 85 and 54 mateably couple, with or without a bearing, to allow for the roller 80 to roll and deny solid footing to an animal or person attempting to cross over the fence 10. Additionally, the hollow interior 89 of the roller 80 may be partially filled with sound making articles, free rolling objects, or fill 70 that contact, and receive resistance from, the octagonally shaped sidewall 81 to produce noise from spinning or rotating roller, which can startle an animal near or contacting the roller 80, and serve as an additional deterrent to the animal attempting to cross over the fence or wall 10. The sound-making articles 70, include but are not limited to, rocks, pebbles, roller bearings, metal or plastic fastener bolts, metal or plastic fastener nuts, and the like.

FIG. 3E shows the roller 80 comprising a hollow octagonal form, and a corresponding cap 88 that mateably couples with opening 85 of the roller 80. The cap 88 may be made of a material that is the same or different than the material of the roller 80. Like the roller 80, the cap 88 may be made of may be formed of a suitable metal, such as steel, iron, cast iron, aluminum, brass, bronze, copper, nickel, zinc, chrome, and may be galvanized, stainless, anodized, plated, coated, or otherwise treated to be a weather resistant non-corrodible material. In some instances, the cap 80 may be made of plastic, fiberglass, carbon fiber, wood, composite material, ceramic, or other synthetic or natural material. The cap 80 may be formed by extrusion, molding, casting, machining, 3D-printing, or any other suitable process, whether additive, reductive, or both. In some instance the cap 88 may maybe a separate or discrete piece releasably or permanently coupled with the roller 80.

Additionally, FIG. 3E further shows an aligner 90, whether formed as a bead 94, or of discreet weights 96, may be disposed at an exterior or interior of the sidewall 81, to bring the aligner 90 to the lowest point of its rotational path, when at an at-rest position 92.

FIG. 3F shows the roller 80 comprising a hollow hexagonal form comprising a hollow interior 89, with sides or segments of the sidewall 81 formed in a hexagonal cross-sectional shape. While the sidewalls 81 are shown with a hexagon shape, any polygon or a shape of any number of sides may be used. Additionally, the sides, lengths, or faces of the sidewall 81 may be formed being straight or flat, as well as with a concave shape as shown in FIG. 3F, and in yet other instance may be formed with a convex shape, undulating shape, or any other shape.

Similar to FIG. 3E, the roller 80 of FIG. 3F may be fit with, or coupled to, a corresponding cap 88 that mateably couples with opening 85 of the roller 80. The cap 88 may be made of a material that is the same or different than the material of the roller 80. Additionally, FIG. 3F further shows the roller 80 may comprise an aligner 90, whether formed as a bead 94, or of discreet weights 96, that may be disposed at an exterior or interior of the sidewall 81, to bring the aligner 90 to the lowest point of its rotational path, when at an at-rest position 92.

FIG. 3G shows an exploded perspective view of a roller 80 comprising a hollow interior 89, and further comprising bumps, knob, or protrusions 70 disposed on an outer surface of, and along the circumference of, the sidewall 81. The bumps 70 may provide traction for a paw or limb or an animal or individual contacting the roller and increase rotation of the roller 80 leading to the animal to lose its footing and not be able to cross over the animal repelling device 30 and the fence 10, In some instances, one of the bumps 87 may be enlarged to form aligner 90. In other instances, a separate aligner 90 distinct from the bumps 87, whether a bead 94 or of discreet weights 96, and whether at an interior surface or exterior surface of the sidewall 81 may be used.

FIG. 3G also shows that caps 88 may be made of one or more parts, and may be releasably coupled to one another such as by threading, or other suitable attachment, whether mechanical, chemical, or both.

Figure 4:
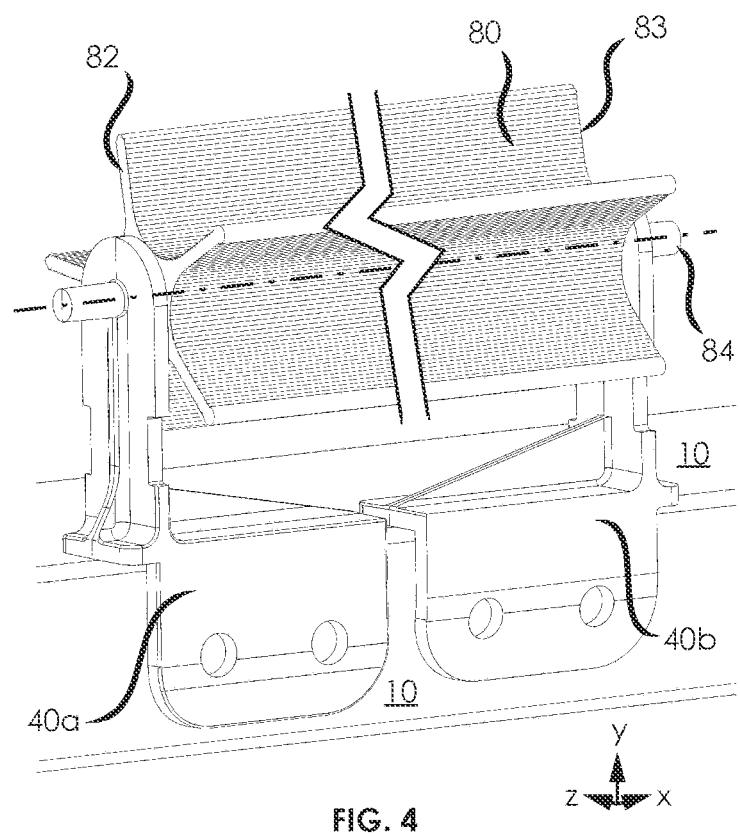
FIG. 4 shows a roller coupled on opposing ends to first and second mounting brackets.

FIG. 4 shows a non-limiting example of a complete assembly of an animal repelling device 30, comprising a roller 80 with five fins, first mounting bracket 40*a*, and second mounting bracket 40*b*, coupled to fence 10.

FIGS. 5A-5E show a number of attachment clips or attachable accessories 110 that may be coupled to the mounting brackets 40 or other suitable location of the animal repelling device 30 or the fence 10. The attachment clips 110 may comprise noise making clips 120, security finial clips 130, lamp clips 140, siren clips 140, additional detail of which is shown and described with respect to FIGS. 5A-5E. In some instances, the attachments clips 110 may provide more than a single function, and may provide clips of one or more of noise making, security, lamp, siren, or other desirable feature.

The attachment clips 110 may be formed of a suitable metal, such as steel, iron, cast iron, aluminum, brass, bronze, copper, nickel, zinc, chrome, and may be galvanized, stainless, anodized, plated, coated, or otherwise treated to be a weather resistant non-corrodible material. In some instances, the attachment clips 110 may be made of plastic, fiberglass, carbon fiber, wood, composite material, ceramic, or other synthetic or natural material. The attachment clips 110 may be formed by extrusion, molding, casting, machining, 3D-printing, or any other suitable process, whether additive, reductive, or both. The attachment clips 110 may be configured to be releasably coupled to mounting bracket 40 at the notch 56.

Figure 5A:
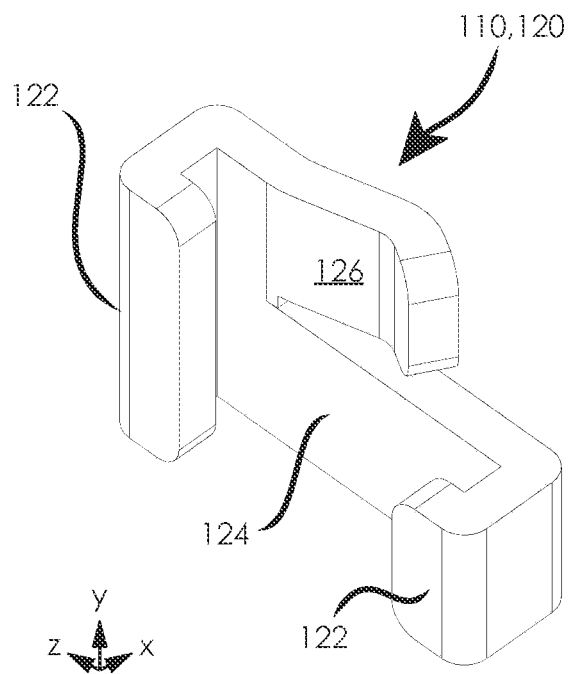
FIGS. 5A-5F show various clips that may be coupled to the mounting brackets of the animal repelling device.
Figure 5B:
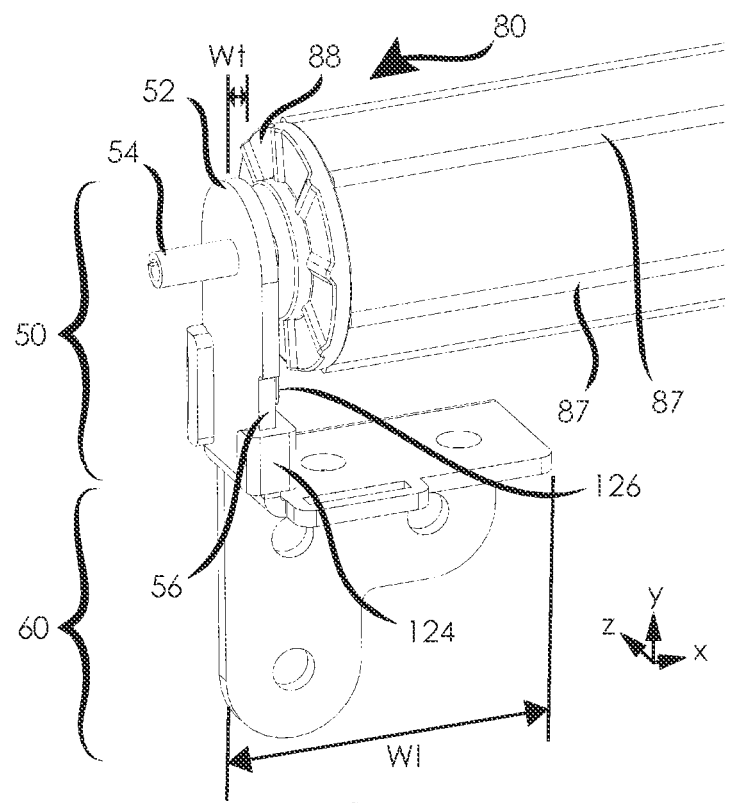

FIGS. 5A-5E show a number of attachment clips 110 by themselves, and also coupled to vertical tabs 52 of mounting brackets 40 as part of animal repelling devices 30. FIGS. 5A and 5B show the noise making clip 120 may be coupled to mounting bracket 40 at the notch 56. The noise making clip 120 comprises rolled edges 122 for releasably coupling with notch 56 and an arm 124 that extends between the rolled edges 122 for securely coupling the clip 120 to the bracket 40. Clip 120 further comprises a tongue 126 that intermittently contacts a portion of the roller 80, such as fins 86 as well as bumps, knob, or protrusions 87 that extend from a surface of the roller 80, such as a cap or end cap 88 of the roller 80.

In some instances, such as that illustrated in FIG. 5B, the bumps 87 may be arranged as spokes radiating away from the axis 84 of the roller or the opening 85 of the roller 80, as well as radiating away from the opening 85*a* in the cap 88 of roller 80. In other instances, such as when the roller 80 is formed with fins 86, the fins 86 may act as the spokes or bumps 87 to provide intermittent contact with the tongue 126 of the noise making clip 120 as the roller 80 rotates about its axis 84.

Figure 5C:
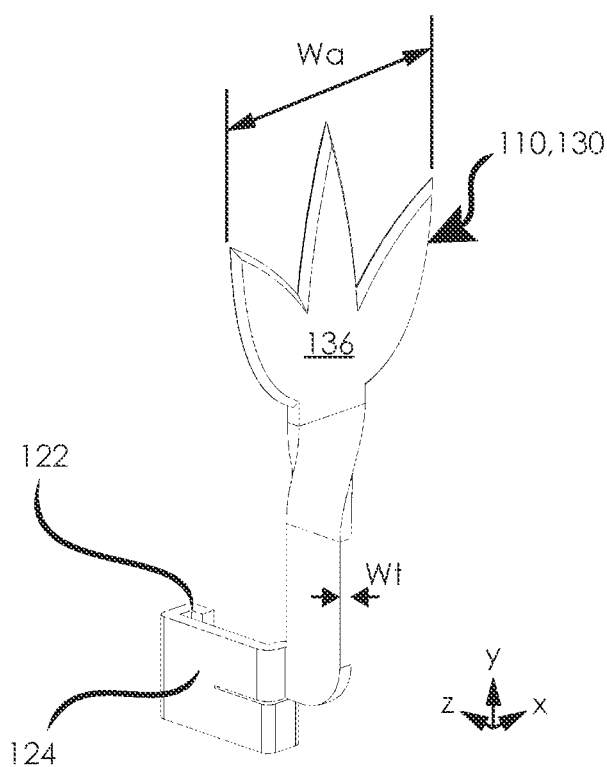
Figure 5D:
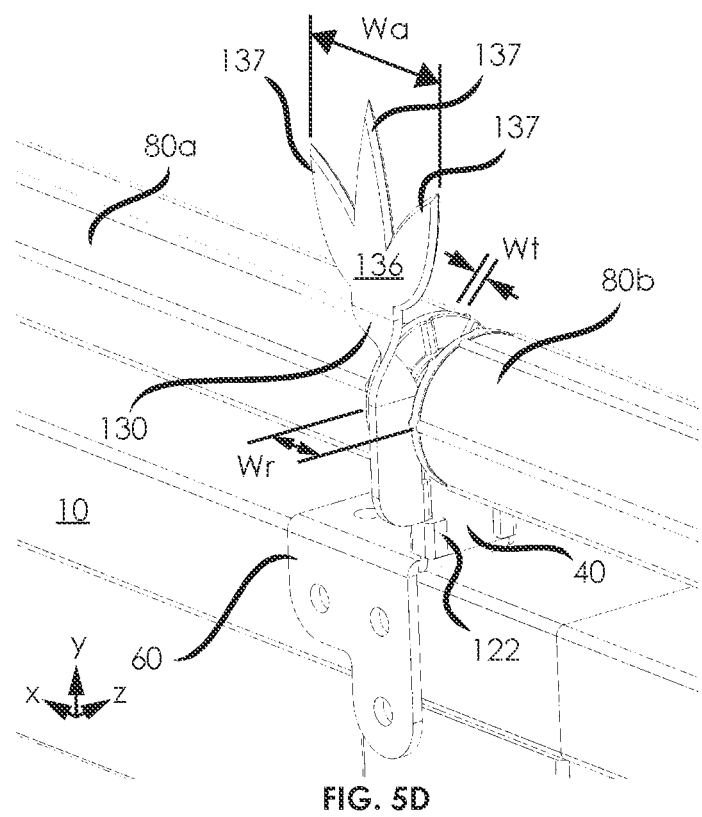

FIGS. 5C and 5D show perspective views of a security finial clip 130 and of the security finial clip mounted to the animal repelling device 30, respectively. The security finial clip 130 comprises rolled edges 122 for releasably coupling with notch 56 and an arm 124 that extends between the rolled edges 122 for securely coupling the clip 120 to the bracket 40. The security finial 130 comprises a trident 136 that comprises points, prongs, tines, or barbs 137, such as three points 137, but any desirable number of points may be used. In some instances, the points 137 may be aligned in a single line or plane as shown, while in other instances the points 137 may be aligned in a series of lines, whether parallel or intersecting, and may be arranged as a plus "+" shape, as circular shape, or as any suitable shape or pattern. In any event, the security finial 130 comprises a trident 136 with a width Wa greater than the width Wt of the portion of the mounting bracket 40—such as the vertical tab 52—to which the security finial clip 130 is coupled. Additionally, or alternatively, the width Wa of the security finial 130 may be greater than a width Wr of the spacing between adjacent rollers 80. With the width Wa of the security finial 130 greater than the width Wt of the mounting bracket or the width Wr of the space between rollers 80, the security finial 130 may prevent an animal or individual from gaining traction on the mounting bracket 40, or on a portion of the animal repelling device 30, or on fence 10, other than the roller 80.

Figure 5E:
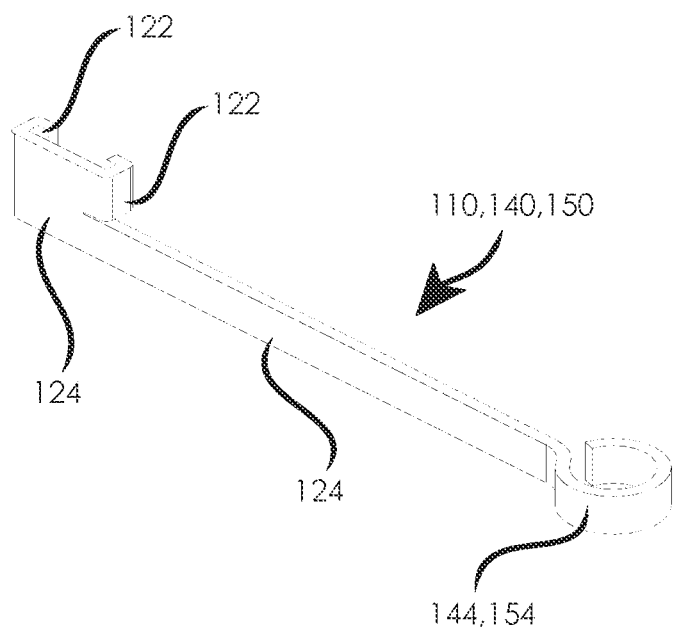
Figure 5F:
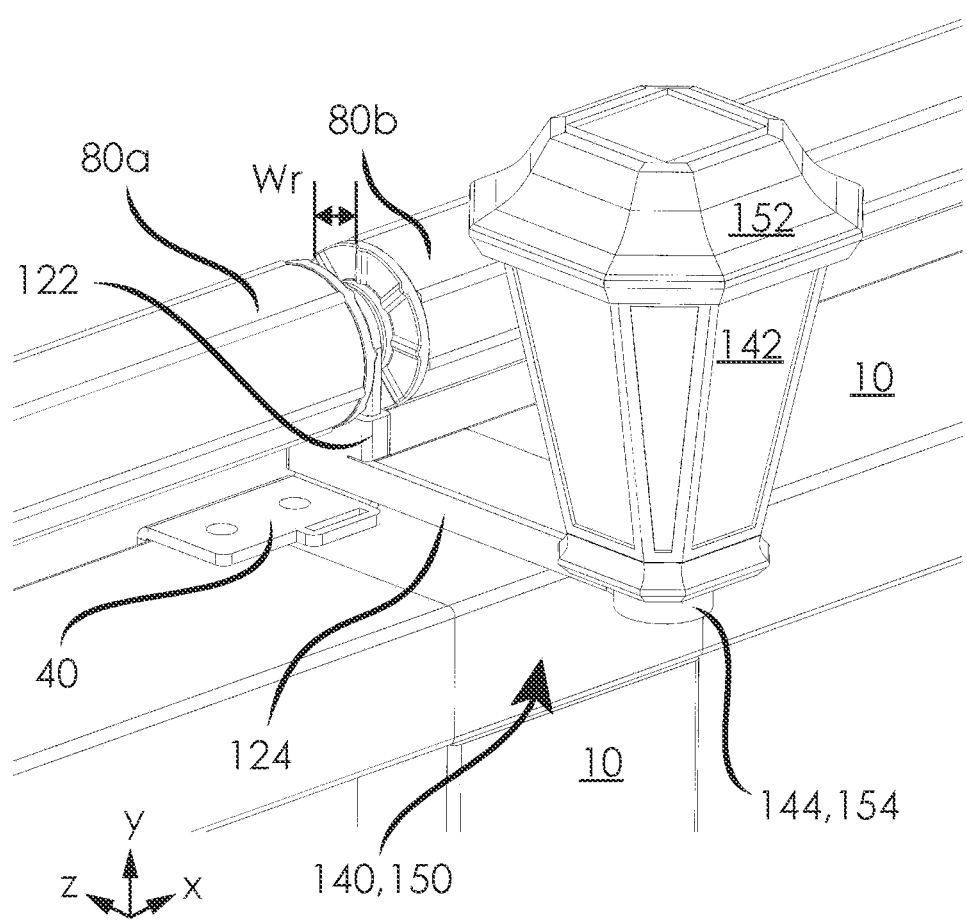

FIGS. 5E and 5F show perspective views of a lamp clip 140 or a siren clip 150, and of the lamp clip 140 or siren clip 150 mounted to the animal repelling device 30, respectively. The lamp clip 140 and siren clip 150 comprise rolled edges 122 for releasably coupling with notch 56 and an arm 124 that is coupled to, and may extends between, and from, the rolled edges 122 for securely coupling the clip 120 to the bracket 40. The arm 124 may comprise a distal end or mounting area 144, 154 for attachment or coupling with lamp 142 or the siren 152.

As such, the animal repelling device 30 provides increased functionality, ease of use, and improved design and additional features not previously known or appreciated in order to provide improved protections against unwanted movement, particularly animal movement, over the top of fences 10.

Where the above examples, embodiments, and implementations reference examples, it should be understood by those of ordinary skill in the art that other systems, devices, and examples could be intermixed or substituted with those provided. In places where the description above refers to particular embodiments, it should be readily apparent that a number of modifications may be made without departing from the spirit thereof and that these embodiments and implementations may be applied to other technologies as well. Accordingly, although particular component examples may be disclosed, such components may be comprised of any shape, size, style, type, model, version, class, grade, measurement, concentration, material, weight, quantity, and/or the like consistent with the intended purpose, method and/or system of implementation. Thus, the presently disclosed aspects and embodiments are, therefore, to be considered in all respects as illustrative and not restrictive. The disclosed subject matter is intended to embrace all such alterations, modifications, and variations that fall within the spirit and scope of the disclosure and the knowledge of one of ordinary skill in the art, as set forth in the claims.

What is claimed is:

1. An animal repelling device, comprising:
   a first mounting bracket and a second mounting bracket, each of which comprises an upper section and a lower section,
      wherein the upper section comprising a vertical tab coupled to and extending from the lower section, a notch formed in the vertical tab, and ribs coupled to opposing sides of the vertical tab and the lower section of the mounting bracket to provide structural support, and
      wherein the lower section comprises a foot with an upper surface and a lower surface opposite the upper surface, the vertical tab coupled to and extending from the upper surface of the foot and a sidewall coupled to and extending from the lower surface of the foot, the sidewall comprising a curved inner surface configured to mateably couple with an upper circular rail of a fence;
   a roller disposed between, rotatably coupled to, and extending axially between, the first mounting bracket and the second mounting bracket, the roller comprising an aligner that biases the roller back to an initial at rest position; and
   an attachment clip releasably coupled to the notch of the vertical tab of at least one of the first mounting bracket or the second mounting bracket, the attachment clip comprising one or more of a noise making clip, a security finial clip, a lamp clip, or a siren clip.

2. The animal repelling device of claim 1, wherein the animal repelling device is formed of a weather resistant non-corrodible material.

3. The animal repelling device of claim 1, wherein the curved inner surface of the sidewall comprises a radius of curvature in a range of 2.5-20 centimeters.

4. The animal repelling device of claim 1, wherein the security finial comprises a trident with a width greater than a width of the mounting bracket to which the security finial clip is coupled.

5. The animal repelling device of claim 1, wherein the noise making clip further comprises:
   an arm comprising a rolled edge coupled to the notch of the vertical tab; and
   a tongue flexibly coupled to the arm and extending to intermittently contact the roller when the roller is spinning.

6. The animal repelling device of claim 1, wherein the aligner of the roller comprises a weighted feature configured to rotate the roller to a position with the aligner at the bottom of the roller.

7. The animal repelling device of claim 1, wherein the vertical tab is offset with respect to the foot of the lower section of the mounting bracket.

8. An animal repelling device, comprising:
   at least one mounting bracket comprising an upper section and a lower section,
      wherein the upper section comprising a vertical tab coupled to and extending from the lower section, a notch formed in the vertical tab, and a rib coupled to the vertical tab, and
      wherein the lower section comprises a sidewall that extends away from the vertical tab, the sidewall comprising a curved inner surface;
   a roller coupled to and extending axially from the first mounting bracket; and
   an attachment clip releasably coupled to the notch of the vertical tab of at least one of the first mounting bracket, the attachment clip comprising a noise making clip that comprises: an arm comprising a rolled edge coupled to the notch of the vertical tab; and a tongue flexibly coupled to the arm and extending to intermittently contact the roller when the roller is spinning.

9. The animal repelling device of claim 8, wherein the rib coupled to the vertical tab further comprises first and second ribs coupled to opposing sides of the vertical tab and further coupled to the lower section of the mounting bracket.

10. The animal repelling device of claim 8, wherein the sidewall comprises a curved inner surface comprising a radius of curvature in a range of 2.5-20 centimeters.

11. The animal repelling device of claim 8, wherein the attachment clip further comprises a security finial that comprises a trident with a width greater than a width of the mounting bracket to which the security finial clip is coupled.

12. The animal repelling device of claim 8, wherein the roller comprises an aligner configured to rotate the roller to an at rest position.

13. The animal repelling device of claim 8, wherein the lower section further comprises a foot with an upper surface and a lower surface opposite the upper surface, the vertical tab coupled to and extending from the upper surface of the foot and a sidewall coupled to and extending from the lower surface of the foot, and wherein the vertical tab is offset with respect to the foot of the lower section of the mounting bracket.

14. An animal repelling device, comprising:
   a mounting bracket comprising an upper section and a lower section, wherein the upper section comprising a vertical tab coupled to and extending from the lower section, a notch formed in the vertical tab, and a rib coupled to the vertical tab, and wherein the lower section comprises a sidewall that extends away from the vertical tab;

a roller coupled to and extending axially from the mounting bracket; and a noise making attachment clip that comprises: an arm comprising a rolled edge coupled to the notch of the vertical tab; and a tongue flexibly coupled to the arm and extending to intermittently contact the roller when the roller is spinning.

15. The animal repelling device of claim 14, wherein the rib coupled to the vertical tab further comprises first and second ribs coupled to opposing sides of the vertical tab and further coupled to the lower section of the mounting bracket.

16. The animal repelling device of claim 14, wherein the sidewall comprises a curved inner surface comprising a radius of curvature in a range of 2.5-20 centimeters.

17. The animal repelling device of claim 14, further comprising an attachment clip that comprises a security finial that comprises a trident with a width greater than a width of the mounting bracket to which the security finial clip is coupled.

18. The animal repelling device of claim 14, wherein the roller comprises an aligner configured to rotate the roller to an at rest position.

* * * * *